Figure 1:
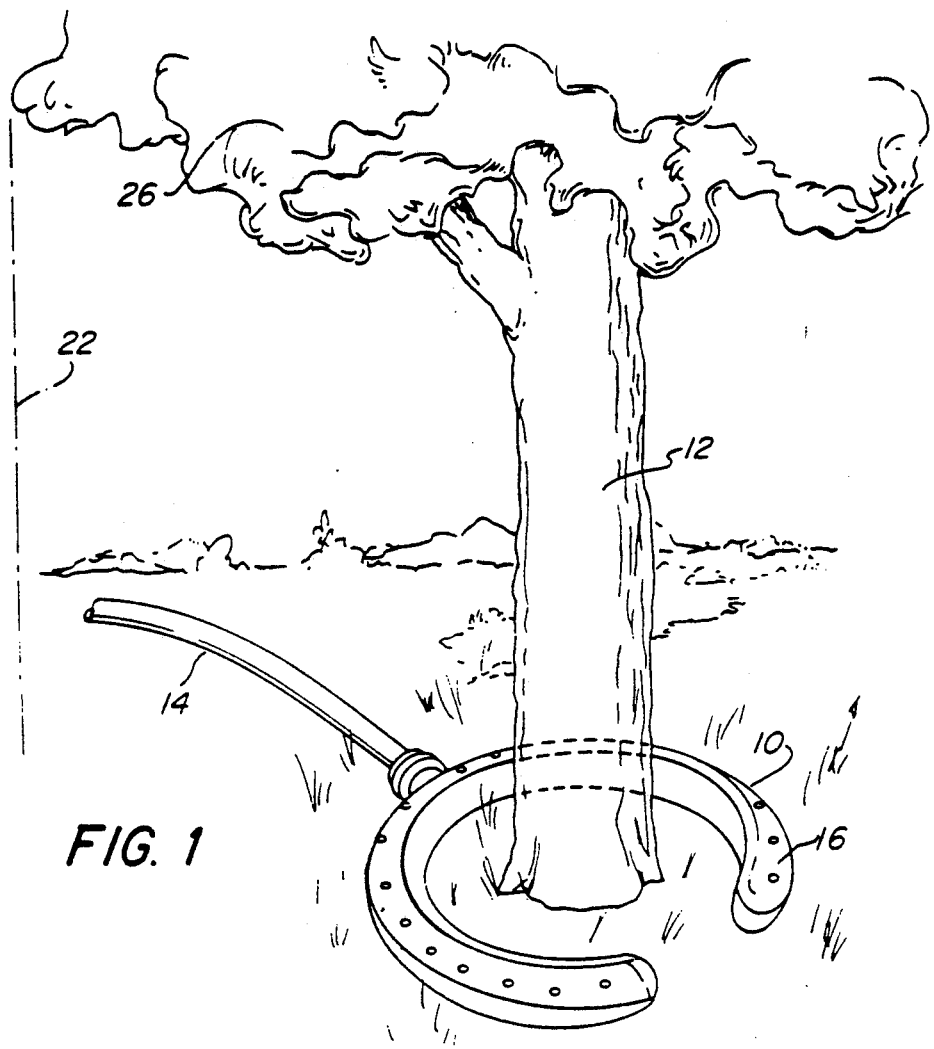

United States Patent [19]
McSheehy

[11] Patent Number: 5,285,968
[45] Date of Patent: Feb. 15, 1994

[54] WATER DISTRIBUTION YOKE FOR TREE CULTIVATION

[76] Inventor: William H. McSheehy, 46 Singletary La., Sudbury, Mass. 01776

[21] Appl. No.: 942,995

[22] Filed: Sep. 10, 1992

[51] Int. Cl.$^5$ .............................................. B05B 15/06
[52] U.S. Cl. ............................... 239/273; 239/DIG. 1; 239/567
[58] Field of Search ......... 239/273, 276, 567, DIG. 1, 239/279; 49/48.5

[56] References Cited

U.S. PATENT DOCUMENTS

| | | |
|---|---|---|
| D. 253,224 | 10/1979 | Roehrich . |
| D. 278,075 | 3/1985 | Dryden . |
| D. 278,076 | 3/1985 | Dryden . |
| D. 303,913 | 10/1989 | Leap . |
| D. 318,403 | 7/1991 | Leap . |
| 1,223,276 | 4/1917 | Haney ............................ 239/276 X |
| 2,909,328 | 10/1959 | Babyak ........................... 239/276 X |
| 4,010,898 | 3/1977 | Williams ......................... 239/547 X |
| 4,087,938 | 5/1978 | Koch . |
| 4,199,106 | 4/1980 | Sato et al. . |
| 4,498,627 | 2/1985 | Arginsky . |
| 4,562,963 | 1/1986 | Butler ................................ 239/273 |

OTHER PUBLICATIONS

A brochure describing a "Conserve Sprinkler", marketed by Larry Villella which is also shown in the attached photographs (one photograph shows the device in operation).

*Primary Examiner*—Andres Kashnikow
*Assistant Examiner*—Kevin Weldon
*Attorney, Agent, or Firm*—St. Onge, Steward, Johnston & Reens

[57] ABSTRACT

A one-piece molded water chamber in the form of an annulus having a large open segment which permits the chamber to serve as a yoke which can be positioned on the ground surrounding the trunk of small trees at the base of the trunk. The water chamber is made of a strong, semi-rigid material so that the segmental opening can be spread apart to permit it to fit around a tree trunk which may be somewhat larger in diameter than the size of the open segment. The chamber is continuously fed with water from a standard garden hose. The wall of the chamber is pierced with a single row of water orifices which are distributed along a line around the upper, outer diameter of the annular body. This arrangement permits the watering of a tree outward, around the drip-line beneath the tree's outer foliage. In addition, this arrangement also prevents introducing water into the soil around the region immediately surrounding the tree trunk. This watering pattern is specifically intended to prevent disease and decay of growing trees prior to reaching their full-grown state.

9 Claims, 1 Drawing Sheet

WATER DISTRIBUTION YOKE FOR TREE CULTIVATION

BACKGROUND

1. Field of Invention

This invention relates to a water supply yoke which is intended to sprinkle water in an annular pattern on the ground around the drip-line, so called, beneath a trees outer foliage. It is specifically intended to keep water away from the inner soil around the trunk of a tree.

2. Description of Prior Art

A serious problem in the growing and cultivation of trees arises when a tree is attacked by disease and/or by animal life such as small worms and insects which live within its body. Such disease and attack is accentuated if the ground around the trunk, as well as the trunk itself, is permitted to be saturated with standing water. It is common practice with the average homeowner to water trees at the base of the trunk, frequently in a depression in the ground around the base. This practice promotes the debilitating disease and decay of a tree. The watering distribution device described herein is intended to eliminate this condition, thereby promoting the cultivation of healthy trees.

The preliminary search for possible similar or like devices which may already have been covered by patent disclosures resulted in the examination of the following patents:

| | |
|---|---|
| (1) No. D253224 - Irrigator For Plants | Filed 6/20/77 |
| (2) No. D278075 - Plant Irrigator | Filed 4/5/82 |
| (3) No. D278076 - Root Irrigator | Filed 6/23/82 |
| (4) No. D303913 - Tree Soaker | Filed 10/19/87 |
| (5) No. D318403 - Tree Soaker | Filed 7/11/89 |
| (6) No. 4087938 - Tree Watering Device | Filed 3/2/77 |
| (7) No. 4199106 - Irrigation Hose | Filed 7/31/78 |
| (8) No. 4498627 - Spray Hoop | Filed 8/30/82 |

My examination of the above eight items leads to the following judgements:

(1) Des. 253224: This patent describes an annular manifold tube having sprinkler orifices distributed over its 360 degree circumference. It is designed to be placed over small plants which have limited height and foliage. Since it is not a split, open annulus it cannot be positioned around taller growing trees. This limitation frustrates the requirement to distribute water solely around the outer drip-line of the tree.

(2) Des. 278075: This patent describes a rigid, U-shaped rectangular three-sided manifold which can be positioned to fit around three sides of a tree, leaving the fourth side of the tree lacking in coverage of water. The manifold takes the form of an accordion section at the two corners joining the three straight sides. The manifold directs the water both inward, toward the tree trunk, as well as outward, away from the tree trunk, thereby frustrating the requirement to distribute water solely around the outer drip-line of the tree.

(3) Des. 278076: This patent descries a variation of the manifold of patent No. Des. 278075 described in (2) above. In this case the manifold, which is extremely similar to (2) above, is given the title "Root Irrigator"; its cross section is tubular in shape rather than square. This manifold also directs water from its sprinkler orifices both inward toward the tree trunk as well as outward, away from the tree trunk, thereby frustrating the requirement to distribute water solely around the outer drip-line of the tree.

(4) Des. 303913: This patent describes a flexible soaker-hose which can be positioned around a circle laid out beneath the drip-line of a tree, providing the tree has a drip-line circumference which will not exceed the maximum length of the soaker-hose. A problem arises should an uninformed user decide to coil this soaker-hose in a tightly-wound spiral close to the base of a tree trunk thereby encouraging the onset of disease and decay of a tree. Further, because of its unweildy size and bulk, this soaker-hose requires an unusually large storage compartment or shelf when not in use. When more than one soaker-hose is employed, this limitation increases the storage problem.

(5) Des. 318403: This is a patent which is derived from the patent D303913 described in (4) above and it is disclosed by the same author. The only difference between the two devices is that the water feed hose is attached to one end of this soaker-hose whereas, in the soaker-hose D303913 described above (4), the water feed hose is connected in the center of the soaker-hose length. Therefore, this soaker-hose suffers from the same limitations described above.

(6) U.S. Pat. No. 4,087,938: This patent describes a relatively large water tube which consists of two identical but separate halves of a doughnut-shaped circular tub which are positioned around the trunk of a tree. Water from inside the split, circular tub seeps into the ground around, and adjacent to, the trunk of a tree, thereby frustrating the requirement to keep water out of the ground immediately surrounding the trunk of the tree. If this tub were made sufficiently large in diameter to wet the ground solely around the outer drip-line of many trees it would have to be of an enormous, impractical size. Further, the cost of a unit such as this would be substantially higher than the cost of my device.

(7) U.S. Pat. No. 4,199,106: This patent describes a double-layer, laminated thermoplastic film in the form of a long linear tape, or duct. The two layers of film are laminated together in a pattern which forms a flat duct or water tube having regularly spaced orifices through the laminated seams which permit water from the internal, central duct to exit onto the surrounding ground. This invention has no relevance, either in form or in function, to my water distribution yoke.

(8) U.S. Pat. No. 4,498,627: This patent describes a large vertically-oriented spray hoop through which children may run and play, as they often do when they jump through the spray from a garden hose or a lawn sprinkler. It is intended to be in the category of toys and has no relevance to the problem and device which I am disclosing herein.

OBJECTS AND ADVANTAGES

Accordingly, several objects and advantages of my present invention are:

(a) To provide the necessary water in the proper region for the cultivation of healthy, disease-free trees.

(B) To specifically direct the water away from the trunk and ground immediately surrounding the trunk of a tree.

(c) To provide a compact, low-cost and uncomplicated device which can be easily connected to a standard commercial garden hose as used around homes and tree nurseries.

(d) To provide such a device which, in the form of a one-piece open or split yoke, can be positioned to surround the trunk of small or medium-sized trees (see FIG. 1) for the purpose of optimizing cultivation conditions through preventing attack by moisture-propogated disease and decay.

(e) To provide such a device which may readily be molded from a stiff, but non-rigid synthetic plastic compound, having an opening in the yoke which may be spread apart with only moderate force to allow the device to be fitted around a tree trunk, which may be slightly larger in diameter in some cases, than the opening in the yoke; this allows a larger range in tree sizes to be accommodated by the device.

(f) To provide a tree-watering yoke for a relatively low cost when compared with the types of devices described in the previous section. This encourages the use of multiple units by homeowners and tree nurseries.

(g) To provide a relatively small and compact device which may be transported, easily carried around by one person and stored in limited spaces around a private home or in a passenger car.

(h) The tree-watering yoke as originally designed was of an outside diameter of eleven inches (27.9 cm.). It can easily be manufactured in other sizes for use with larger trees if so desired.

(i) This device can also be used to supply water to large ornamental shrubs, such as rhododendrons, where disease control is often required. In such a case, the diameter of the water spray circle is simply controlled by adjusting the tap faucet to which the supply end of the feed hose is connected.

The application of this device will become apparent from the cosideration of the following drawings:

FIG. 1 shows the tree-watering yoke 10 in its intended position surrounding the trunk of the tree 12. The so-called drip-line 22 of the tree is indicated by the vertical broken line below the outer foliage 26.

Figure 2:
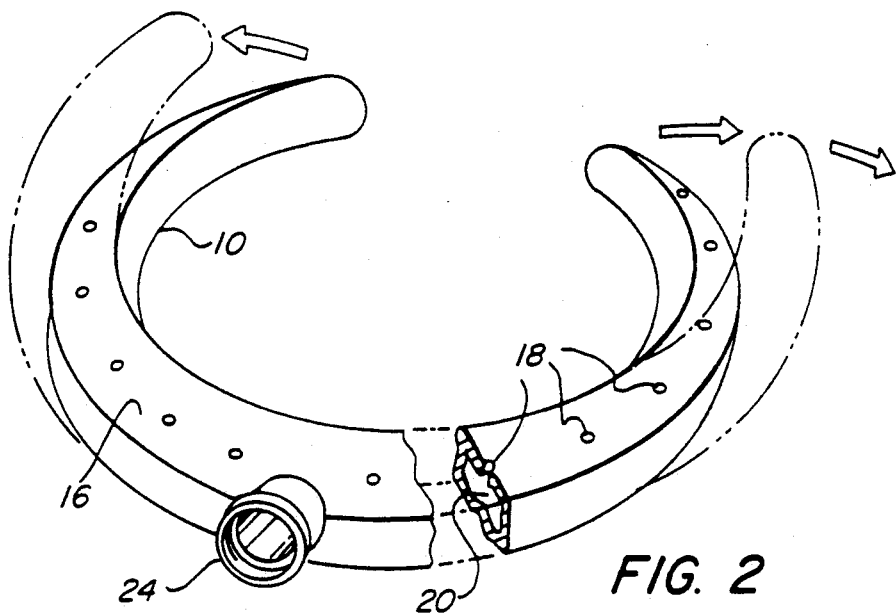

FIG. 2 is a closeup sketch of the various details of the yoke. The dotted lines with arrows indicate how the opening in the yoke can be spread apart to permit the yoke to be positioned around the tree trunk which may be somewhat larger in diameter than the normal distance in the unexpanded body 10. The internal water chamber 20 is shown in the cutaway view.

OPERATION—FIGS. 1 AND 2

In a typical embodiment of the water distribution yoke, the yoke 10 is positioned around the trunk of a tree 12. The opening in the yoke opposite the water feed hose 14 is the means for introducing the trunk of the tree into the central space of the yoke, as illustrated in FIG. 1.

In the detailed sketch of the yoke shown in FIG. 2, the upper, outer periphery of the yoke 10 bears a 45 degree facet 16 containing 44 (nominal) small circular orifices 18 equally spaced along the diametrical center line of the 45 degree facet 16. Water from the internal chamber 20 is squirted outward toward the drip-line 22 of the tree 12, which lies below the outer foliage. Thus, this water is made available to the small network of rootlets ("feeder roots") which lie beneath the outer foliage 26. No water, therefore, can reach inward toward the ground surrounding the trunk of the tree. Water is supplied continuously to the internal chamber 20 through the female hose connection or water-inlet 24 to which a standard commercial garden hose is connected. The distance to which water can reach outward toward the drip-line 22 of a particular tree size is regulated by the tap-faucet to which the opposite end of the hose is connected.

The dotted lines and arrows shown in FIG. 2 illustrate the ability of this stiff, but non-rigid yoke body to be spread apart without undue manual force to permit the yoke to be positioned around a tree trunk which may be larger than the normal opening in the body of the yoke 10.

Accordingly, the reader will see that the water distribution yoke of this invention can be used to meet the requirement for the cultivation of healthy, disease-free trees wherein the soil around the trunk of the tree must not be permitted to remain constantly wet. When water is introduced in the cultivation and feeding of a tree, it should wet the outer soil beneath the so-called "drip-line" below the outer foliage, where the young feeder root system is located. The water distribution yoke of this invention is designed to direct and distribute the water outward to the desired drip-line region only. Furthermore, this water distribution yoke has the additional advantages in that, having no moving parts to wear out or to adjust, it is a simple, one-piece molded unit, relatively small, compact and light weight making it easy to store in limited facilities, and to be handled and set up by one person, and to be transported in a standard passenger car. In addition, the following advantages of this invention should be considered:

In order to satisfy the ability of this device to be expanded or opened, it can be molded in one piece from a semi-rigid urethane rubber compound which will provide high structural strength yet permit the spreading of the yoke to accommodate somewhat larger trees through its structural flexibility.

The design and construction of this one-piece molded yoke makes it very economical to manufacture in both small and large quantities, unlike a great many molded plastic items which must be manufactured in extremely large quantities, in extremely expensive molds, in order to reduce the cost of purchase to acceptable commercially-economic limits.

This water distribution yoke can also be used in the propogation and control of other types of disease-prone plants and ornamental shrubs, such as the common rhododendron.

Although the description above shows that this water distribution yoke has several major qualities and advantages beyond the other devices in its field, these should not be construed as limiting the scope of this invention. For example, it can also be employed to distribute water in a circular pattern for smaller plants than trees or shrubs. In addition, it can be manufactured from other materials than the proscribed urethane rubber compound providing that its inherent strength-with-flexibility is satisfied. For example, an alternate material could be a high-strength polyolefin plastic compound.

Thus the scope of this invention should be determined by the appended claims and their legal equivalents, rather than by the examples given herein.

I claim:

1. A water distribution yoke for watering along the drip-line of a tree, comprising:
   a substantially semicircular-shaped yoke, the yoke having an inside, an outside, a center, the yoke having a single set of a plurality of orifices, a throat, and a water-inlet, the orifices being distributed around the outside of the yoke, the water-inlet being located opposite the throat, wherein the throat passes in a substantially horizontal plane around the trunk of a tree; and wherein water enters the water-inlet and exits the orifices such that all of the water is directed toward the surface area substantially along and outward from the drip-line of the tree.

2. The water distribution yoke of claim 1, wherein the water does not substantially spray between the trunk of the tree and the drip-line of the tree.

3. The water distribution yoke of claim 1, wherein the orifices are distributed evenly around the outside of the yoke.

4. The water distribution yoke of claim 1, wherein the water exits the orifices at an angle of substantially forty-five degrees from the horizontal plane.

5. The water distribution yoke of claim 1, wherein the yoke is made of a flexible plastic.

6. The water distribution yoke of claim 1, wherein the yoke is made of a urethane rubber.

7. A water distribution yoke for watering along the drip-line of a tree, comprising:

a substantially semicircular-shaped yoke in a plane, the yoke having an inside, an outside, a center, the yoke having a single set of a plurality of orifices, a throat, and a water inlet, the orifices being evenly spaced around the outside of the yoke, the water-inlet being located opposite the throat, wherein the throat passes in a substantially horizontal plane around the trunk of the tree;

wherein water enters the water-inlet and exits the orifices at an angle of substantially a forty-five degree angle from the horizontal plane;

wherein water enters the water-inlet and exits the orifices such that all of the water is directed toward the surface area substantially along and outward from the drip-line of the tree but does not substantially spray between the trunk of the tree and the drip-line of the tree.

8. The water distribution yoke of claim 7, wherein the yoke is made of a flexible plastic.

9. The water distribution yoke of claim 7, wherein the yoke is made of a urethane rubber.

* * * * *